No. 889,116. PATENTED MAY 26, 1908.
J. F. GENT.
DEGERMING INDIAN CORN AND OTHER GRAIN.
APPLICATION FILED JAN. 15, 1908.
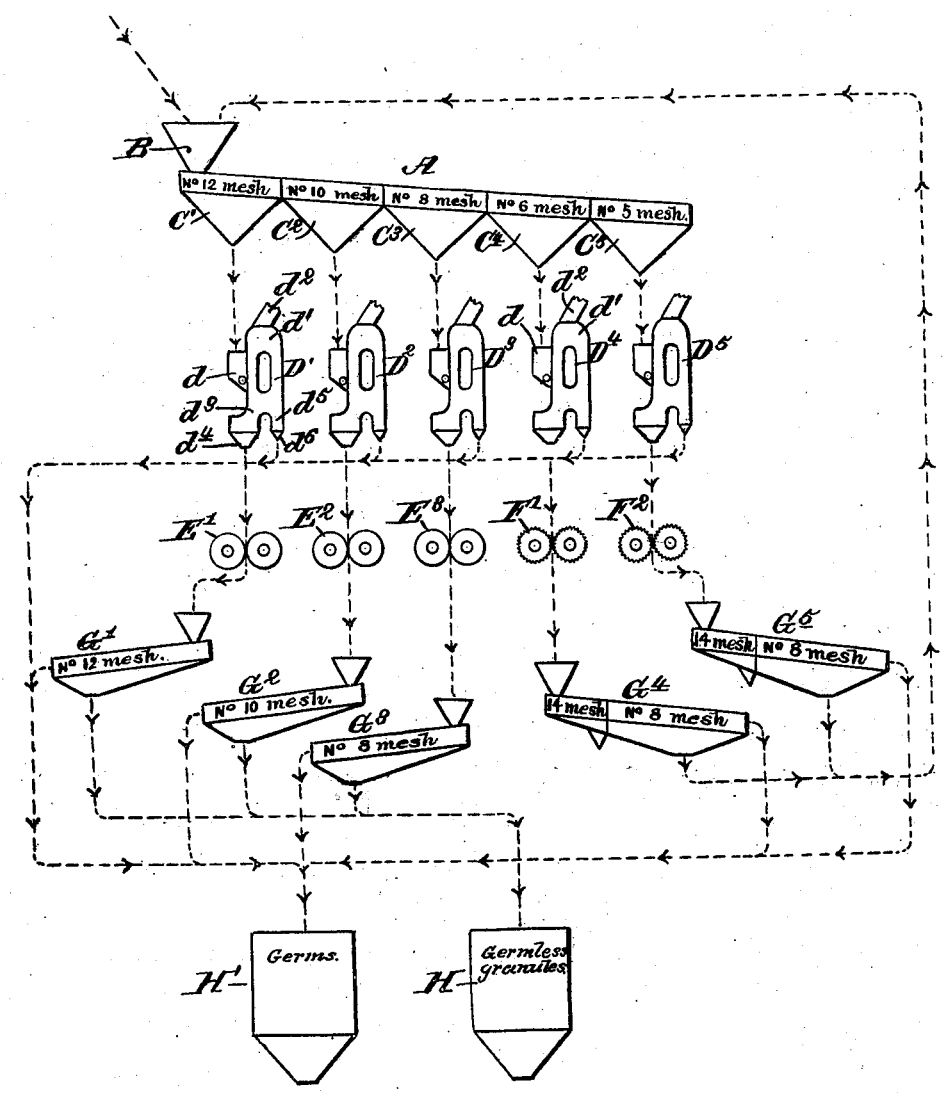
Witnesses.
Robert Everitt.
W. Lee Helius.
Inventor.
Joseph F. Gent.
By Macellen Bain
his Atty.

UNITED STATES PATENT OFFICE.

JOSEPH F. GENT, OF TERRE HAUTE, INDIANA, ASSIGNOR OF TWO-THIRDS TO THOMAS T. GAFF, OF BARNSTABLE, MASSACHUSETTS.

DEGERMING INDIAN CORN AND OTHER GRAIN.

No. 889,116.  Specification of Letters Patent.  Patented May 26, 1908.

Application filed January 15, 1908. Serial No. 410,937.

*To all whom it may concern:*

Be it known that I, JOSEPH F. GENT, of Terre Haute, in the county of Vigo and State of Indiana, have invented a new and useful Improvement in Degerming Indian Corn and other Grain, of which the following is a specification.

This invention is designed more particularly to effect the separation of the germs from the starch bearing granules or "grits" of Indian corn. It can however be used for the separation of the germs from the grits or starch bearing fragments of other grains of sufficient hardness, and I desire to be understood as including in my claim any such application of the invention.

The characteristic of my invention is that I subject a mixture of germs and grits to pressure between elastic yielding surfaces capable of being locally indented, the pressure being so graduated that the germs will be flattened while the grits retain their original shape unreduced—this procedure being based upon the fact, as I have ascertained it to be, that if a mixture of grits and germs of the same grade or size be passed between pressure rolls, one or both of which have a rubber or equivalent yielding elastic facing, the germs will be flattened at a pressure under which the grits or starch bearing granules will retain their shape unchanged, merely indenting themselves in the elastic yielding facing on the rolls between which they pass. By reason of this difference in the resistant properties of germs and grits I am enabled to effect expeditiously and thoroughly the separation of a mixture of germs and grits of any given grade or size without reducing the grits or changing the form of the grits. Taking for example a mixture of germs and grits obtained from a #10 mesh screen, I pass this mixture between rollers one or both of which have a soft rubber or equivalent facing and are adjusted to a pressure which will flatten the germs without breaking or changing the form of the grits. I then send the thus-treated mixture to a screen of the same #10 mesh, with the result that only the grits pass through the screen cloth while the flattened and necessarily expanded germs are separated out and carried off over the tail of the screen. This I believe to be new with me.

To enable others skilled in the art to understand and use my invention I will now proceed to describe it more particularly in connection with the accompanying diagram, or "flow sheet" as it is technically termed, which represents the present preferred embodiment of my invention, although further practice may dictate changes in details.

The arrowed lines indicate the direction of travel of the material through the plant.

In the diagram A is a grading screen receiving the charge from a hopper B, and formed with five successive screen surfaces of successively larger mesh viz: No. 12 mesh No. 10 mesh and so on as indicated on the screen—the figures 12, 10, etc. representing the mesh per inch of the several grading screen sections.

$C'$, $C^2$, $C^3$, etc. are hoppers, one for each grading screen section, which receive and collect the material which passes through the several sections.

$D'$, $D^2$, $D^3$, $D^4$, $D^5$ represent any suitable aspirators one for each hopper C; in each aspirator, $d$ is the hopper and feed roll, $d'$, the expansion chamber, $d^2$ the suction pipe, $d^3$ the front section leg with its discharge $d^4$ and $d^5$ the rear suction leg with its discharge $d^6$. Aspirators of this general character are well known and require no further description.

$E'$, $E^2$ $E^3$ are three pairs of adjustable pressure rollers one or both rollers of each pair having an elastic yielding face of soft rubber or equivalent composition or material. One pair of these rollers is for each one of the three aspirators which receive the sifted mixture of germs and grits from the 12 mesh, 10 mesh and 8 mesh screen sections respectively.

$F'$, $F^2$ are two pairs of steel or chilled iron corrugated grinding or crushing rolls, one pair for each one of the two aspirators which receive the products from the 6 mesh and 5 mesh screen sections respectively.

$G'$, $G^2$, $G^3$, $G^4$, $G^5$ are separating screens of the mesh indicated on them respectively— one for each pair of rolls $E'$, etc. and $F'$, etc.

H, H' are storage bins for the separated products—germless grits and germs, respectively.

The course of the material through the plant is indicated by the arrowed lines, proper conduits and conveyers being provided for this purpose as needed.

The operation is as follows: In treating Indian corn, for example, the mixture of granules or grits and germs may come from a "degerminator" such for instance as that illustrated in Patent No. 877,640 granted to myself and T. T. Gaff January 28, 1908. The entire mass leaving the degerminator is of course first subjected to a screening operation for separating off the hominy—the remainder of the mass containing substantially all the germs and being that which is to be here treated. This mixture of granules or grits and germs, after being freed from fine meal, is conveyed to the hopper B whence it is fed onto the grading screen A where it is separated into grades, according to the number and mesh of the screen sections. Each of the three grades which pass through the 12 mesh, 10 mesh and 8 mesh screen sections, is collected in its own hopper $C'$, $C^2$, $C^3$, and is thence conveyed to its own aspirator $D'$, $D^2$, $D^3$ where any light feed stuffs are carried off through the suction pipes $d^2$. Particles of light germs will gather and be further aspirated in the rear suction legs $d^5$, and will be conducted from the discharges $d^6$ to the germ bin $H'$. The remaining mass of mingled germs and grits is discharged at $d^4$, and conveyed to the three pairs of elastic yielding pressure rolls $E'$, $E^2$, $E^3$—one grade to each pair of rolls—which act upon the material passing between them with sufficient pressure to flatten the germs only without reducing or changing the shape of the more resistant grits. The thus-treated mass thence passes to separating screens $G'$, $G^2$, $G^3$ one for each grade—$G'$ having the same mesh as the first section of A, $G^2$ having the same mesh as the second section of A, and $G^3$ having the same mesh as the third section of A. In other words each one of these three grades after being subjected to the action of the pressure rolls, is passed through a screen of the same mesh as that of the screen section through which it passed before reaching the rolls. In these screens $G'$, $G^2$, $G^3$ the grits unchanged in shape will pass through the screen cloth, and will thence be conveyed to the bin H as indicated. The germs however by reason of their being flattened and expanded will not pass through the screen cloth but will pass over the tails of the screens whence they are conveyed to the germ bin $H'$ as indicated. The coarser mingled grits and germs from the 6 mesh and 5 mesh sections of grading screen A are similarly aspirated in aspirators $D^4$, $D^5$ respectively—the light germs discharged at $d^6$ being conveyed to the germ bin $H'$ as indicated. The coarse germs and grits from the discharges $d^4$ of these aspirators are conveyed to the corrugated rolls $F'$, $F^2$ by which they are sufficiently reduced to pass through the No. 8 mesh sections at the tail end of the screens $G^4$, $G^5$ with which said rolls are associated. The fine meal produced by the grinding or crushing action of the corrugated rolls is sifted out through the fine 14 mesh cloth at the head of each screen $G^4$, $G^5$ and is carried off to some receptacle. The grits and germs which pass through the coarser sections of these screens are carried back to hopper B to be again graded and sent to the elastic rolls for treatment. The germs which may have been flattened and spread out by the action of the corrugated rolls pass over the screens and are conveyed to the germ bin $H'$.

The use of the corrugated rolls is a nicety rather than a necessity. They may be dispensed with and the products from the aspirators $D^4$ $D^5$ sent direct to elastic rolls. I however prefer to use the corrugated rolls in the manner indicated, as giving a better result.

The different grades may be subjected to two or more rollings in succession between the elastic rolls, passing directly from one pair of such rolls to the next pair before screening.

I have indicated in the diagram one conventional way of separating the material to be treated into different gradings or sortings before subjecting the same to the subsequent germ flattening and screening operations. Manifestly, however, the preliminary separation of the charge into different gradings or sortings can be effected in other ways known to those skilled in the milling art, what is essential being that the different gradings or sortings, however obtained, shall be subjected, each separately from the others, to elastic pressure between its own pair or set of yielding-surfaced rolls to flatten the germs while the grits retain their shape, and then shall be subjected, each separately from the others, to screening action on its own appropriate screen—that is to say, on a screen of substantially the same mesh as that through which it passed before the flattening operation.

Having described my improvement and the best way now known to me of carrying the same into effect what I claim herein as new and desire to secure by Letters Patent is—

In the art of degerming Indian corn and other grain, the method of separating the germs from the grits or starch bearing fragments of grain which consists in first screening and grading the mixture of grits and germs, then subjecting each grade to elastic pressure between yielding surfaces whereby the germs will be flattened while the grits retain their shape, and then again subjecting the thus treated mixture of germs and grits, to screening action on a screen of the same mesh as that through which it passed before the flattening operation, whereby the flattened germs will be separated out and carried off from the grits, substantially as hereinbefore set forth.

In testimony whereof I affix my signature in presence of two witnesses.

JOSEPH F. GENT.

Witnesses:
 LAWRENCE BURGET,
 PEARL CLIFFORD.